United States Patent
Nagamitsu

(10) Patent No.: US 11,935,334 B2
(45) Date of Patent: Mar. 19, 2024

(54) CENTER, UPDATE MANAGEMENT METHOD, AND NON-TRANSITORY STORAGE MEDIUM

(71) Applicant: TOYOTA JIDOSHA KABUSHIKI KAISHA, Toyota (JP)

(72) Inventor: Shoichi Nagamitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 315 days.

(21) Appl. No.: 17/545,080

(22) Filed: Dec. 8, 2021

(65) Prior Publication Data

US 2022/0262170 A1  Aug. 18, 2022

(30) Foreign Application Priority Data

Feb. 16, 2021  (JP) ................................. 2021-022533

(51) Int. Cl.
    *G06F 8/65*    (2018.01)
    *G07C 5/00*    (2006.01)
(52) U.S. Cl.
    CPC ............... *G07C 5/008* (2013.01); *G06F 8/65* (2013.01); *G07C 5/006* (2013.01)

(58) Field of Classification Search
    CPC ............ G07C 5/008; G07C 5/006; G06F 8/65
    See application file for complete search history.

(56) References Cited

FOREIGN PATENT DOCUMENTS

JP       2020-004245 A    1/2020

*Primary Examiner* — Mathew Franklin Gordon
(74) *Attorney, Agent, or Firm* — Oliff PLC

(57) ABSTRACT

A center, configured to communicate over a network with a predetermined server and an OTA master installed in a vehicle, includes a processor. The processor is configured to determine whether a command is transmittable from the center to the OTA master based on communication means information. The processor is configured to transmit, when the processor determines that the command is transmittable from the center to the OTA master, the command to the OTA master using communication means defined in the communication means information. The processor is configured to transmit, when the processor determines that the command is not transmittable from the center to the OTA master, request data to the OEM server. The request data is data for commissioning the OEM server to transmit the enabling command.

6 Claims, 7 Drawing Sheets

FIG. 8

| OEM DATA (61) | MODEL DATA (62) | COMMUNICATION MEANS DATA (63) |
|---|---|---|
| 0001 | aaaaa | SMS OF CENTER |
| 0002 | bbbbb | SMS OF OEM B |
| 0003 | ccccc | Wi-Fi OF OEM C |
| 0003 | ddddd | V2X OF OEM D |
| ⋮ | ⋮ | ⋮ |

FIG. 9

| VEHICLE IDENTIFICATION NO. (71) | COMMUNICATION MEANS DATA (72) | |
|---|---|---|
| 1111111111 | SMS OF CENTER | ... |
| 2222222222 | SMS OF OEM B | ... |
| 3333333333 | Wi-Fi OF OEM C | ... |
| 4444444444 | V2X OF OEM D | ... |
| ⋮ | ⋮ | |

CENTER, UPDATE MANAGEMENT METHOD, AND NON-TRANSITORY STORAGE MEDIUM

CROSS-REFERENCE TO RELATED APPLICATION

This application claims priority to Japanese Patent Application No. 2021-022533 filed on Feb. 16, 2021, incorporated herein by reference in its entirety.

BACKGROUND

1. Technical Field

The present disclosure relates to a center, an update management method, and a non-transitory storage medium, that is capable of communicating with, over a network, an Over the Air (OTA) master installed in a vehicle and a predetermined server.

2. Description of Related Art

Vehicles have a plurality of pieces of in-vehicle equipment (referred to as "ECUs") installed onboard, to carry out control functions. The ECU includes a processor and a storage unit. The control functions of the ECU is realized by the processor executing software stored in a storage unit. Also, the software stored in each ECU can be updated. Specifically, the software can be updated using external equipment connected via a diagnostic connector provided in the vehicle, in a maintenance shop or the like. Also, communication equipment provided to the in-vehicle network and a communication network such as the Internet can be wirelessly connected, to update with software downloaded from a distribution server provided in an update center via wireless communication. (For example, Japanese Unexamined Patent Application Publication No. 2020-004245 (JP 2020-004245 A))

Now, in order to use the update (OTA service) via the aforementioned wireless communication, the user must enter into a contract for usage of the OTA service. Once the contract is established, the update center then transmits, to the OTA master, an enabling command for enabling the software update functions of the OTA master installed in the vehicle. Now, the communication means used for transmitting this enabling command are decided in advance in the update center. For example, transmitting enabling commands using a Short Message Service (SMS) has been decided upon. The enabling command is then received by the OTA master, following which the enabling command is executed, thereby enabling the OTA service.

SUMMARY

As described above, the update center attempts to enable the software update functions of the OTA master using communication means decided in advance. However, vehicles are manufactured by various original equipment manufacturers (OEMs). Accordingly, the communication technology used may differ depending on the OEM and the model, from the perspective of each OEM providing unique services, and so forth. Thus, a situation in which a vehicle does not support the communication means decided in advance can occur. There is concern that in such a case, the above enabling command may not be transmitted, and the software may not be updated.

The present disclosure provides a center, an update management method, and a non-transitory storage medium, capable of enabling a software update function even for vehicles that do not support communication means decided in advance for enabling the software update function.

A first aspect of the present disclosure is a center configured to communicate over a network with a predetermined server and an Over the Air (OTA) master installed in a vehicle. The center includes a processor. The processor is configured to store communication means information in which information indicating communication means for transmitting predetermined data to the OTA master is defined in advance. The processor is configured to determine whether a command is transmittable from the center to the OTA master based on the communication means information. The processor is configured to transmit, when the processor determines that the command is transmittable from the center to the OTA master, the command to the OTA master using the communication means defined in the communication means information. The processor is configured to transmit, when the processor determines that the command is not transmittable from the center to the OTA master, request data to an original equipment manufacturer (OEM) server. The OEM server is managed by a manufacturer of the vehicle in which the OTA master is installed. The request data is data for commissioning the OEM server to transmit the command.

According to the center of the present disclosure, a command can be transmitted even to vehicles that do not support communication means decided in advance.

In the center according to the first aspect of the present disclosure, the processor may be configured to determine whether a predetermined condition is satisfied. The predetermined condition may be a condition for changing a software update function of the OTA master for the vehicle from a disabled state to an enabled state. The processor may be configured to determine, when the processor determines that the predetermined condition is satisfied, whether the command is transmittable from the center to the OTA master based on the communication means information. The command may be an enabling command for changing the software update function of the OTA master that is determined to satisfy the predetermined condition to an enabled state.

In the center according to the first aspect of the present disclosure, the communication means information may include at least information relating to communication technology or a communication standard, used in the communication means for transmitting the predetermined data. The processor may be configured to determine that, when the communication means of the vehicle is the communication means using the communication technology or the communication standard that are not able to be used by the center, transmission is not able to be performed from the center to the OTA master of the vehicle.

In the center according to the first aspect of the present disclosure, the processor may be configured to, when the software update function is in an enabled state, perform communication relating to the software update function with the OTA master, using another network that is different from the network used for transmission of the enabling command.

A second aspect of the present disclosure is an update management method executed by a computer including a processor, memory, and a communication device. The communication device is configured to communicate with a predetermined server an OTA master installed in a vehicle over a network. The method includes storing, in the memory, communication means information in which information indicating communication means for transmitting predetermined data to the OTA master is defined in advance, determining whether a command is transmittable from a center to the OTA master based on the communication means information, transmitting, when it is determined that the command is transmittable from the center to the OTA master, the command to the OTA master using the communication means defined in the communication means information, and transmitting, when it is determined that the command is not transmittable from the center to the OTA master, request data to an OEM server. The OEM server is managed by a manufacturer of the vehicle in which the OTA master is installed. The request data is data for commissioning the OEM server to transmit the command.

A third aspect of the present disclosure is a non-transitory storage medium storing instructions that are executable by a computer including a processor, memory, and a communication device, and that cause the computer to perform functions. The communication device is configured to communicate with a predetermined server and an OTA master installed in a vehicle over a network. The functions include storing, in the memory, communication means information in which information indicating communication means for transmitting predetermined data to the OTA master is defined in advance, determining whether a command is transmittable from a center to the OTA master based on the communication means information, transmitting, when it is determined that the command is transmittable from the center to the OTA master, the command to the OTA master using the communication means defined in the communication means information, and transmitting, when it is determined that the command is not transmittable from the center to the OTA master, request data to an OEM server. The OEM server is managed by a manufacturer of the vehicle in which the OTA master is installed, and the request data is data for commissioning the OEM server to transmit the command.

The present disclosure provides a center, an update management method, and a non-transitory storage medium, capable of enabling a software update function even for vehicles that do not support communication means decided in advance for enabling the software update function.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 8 is an example of a data configuration of communication means definition data 53;

FIG. 9 is an example of a data configuration of a vehicle information database 54.

DETAILED DESCRIPTION OF EMBODIMENTS

An embodiment will be described below in detail with reference to the drawings.

Configuration

Figure 1:
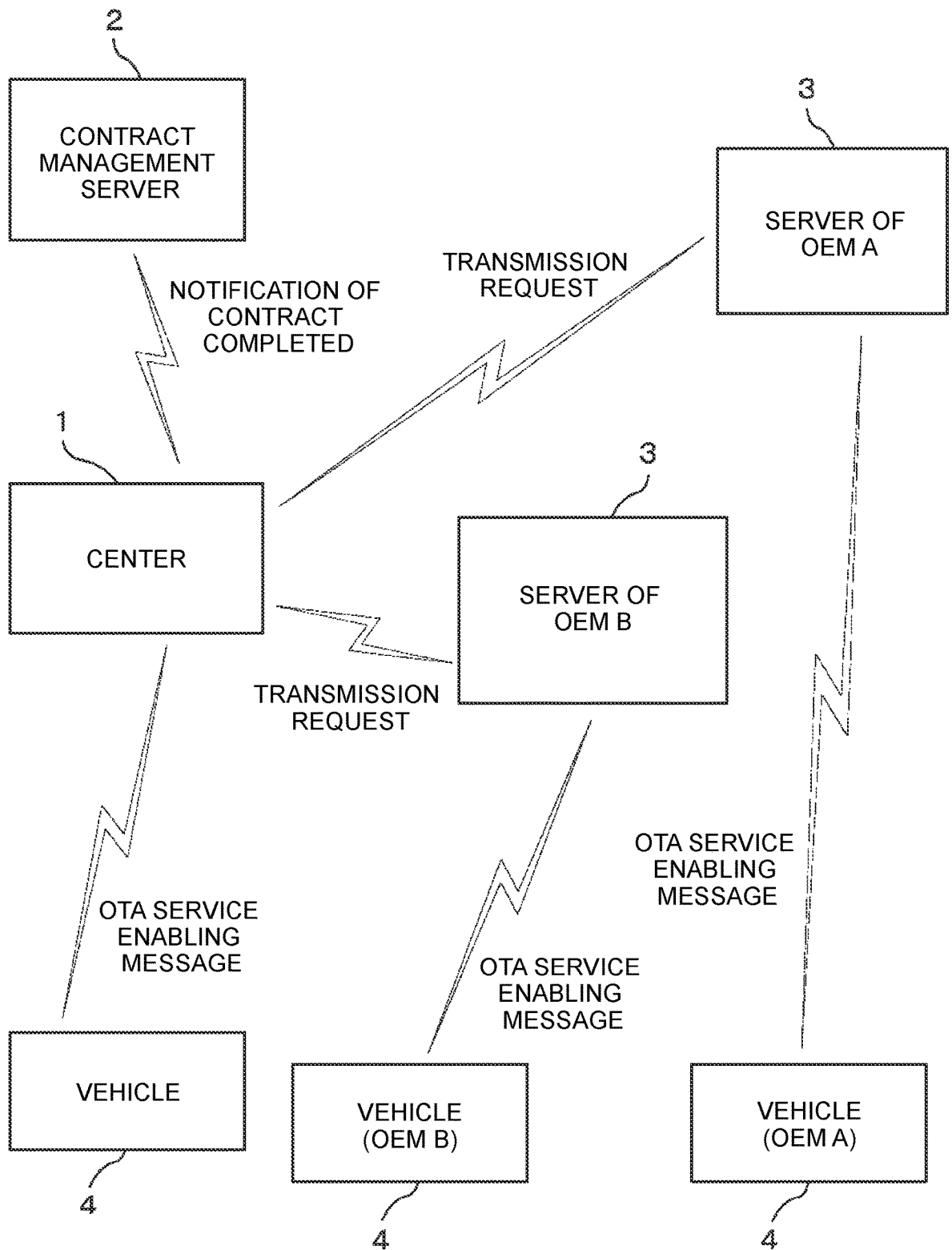
FIG. 1 is a block diagram illustrating an overall configuration of an update management system according to an embodiment.

FIG. 1 is a block diagram illustrating an overall configuration of an update management system according to the embodiment. The update management system includes an Over the Air (OTA) center (hereinafter, simply referred to as "center") 1, a contract management server 2, a plurality of original equipment manufacturer (OEM) servers 3, and a plurality of vehicles 4.

The center 1 is a server for managing software updating of in-vehicle equipment provided to the vehicle 4. More precisely, the center 1 is a center system that includes such a server. Hereinafter, the center 1 will be described as a server, for the sake of convenience of description. The function of updating software of the in-vehicle equipment (hereinafter referred to as "software update function") is in a disabled state at the time of shipping from the plant. In order to use the function of updating software, a contract to use the OTA service (a service for receiving software updating using the Internet network) needs to be established. Upon receiving a notification from the contract management server 2 that the contract for the OTA service has been completed for a predetermined vehicle 4, the center 1 transmits an "enabling message" to the vehicle 4 (more accurately, a later-described OTA master 21). The enabling message includes a text message for notifying the user that the OTA service has been enabled, and an "enabling command" for enabling the software update function. When transmitting this message, the center 1 determines whether the enabling message can be directly transmitted from the center 1 to the vehicle regarding which the contract has been completed, using communication means (e.g., cellular phone network, etc.) decided in advance. In the present embodiment, a case of using Short Message Service (SMS) as the communication means decided in advance will be described as an example. When the center 1 determines that transmission can be made from the center 1 to the vehicle 4 using SMS, the center 1 transmits the enabling message to the vehicle 4 using SMS. On the other hand, when the center 1 determines that the vehicle 4 is a vehicle of a predetermined OEM (for example, a vehicle without a SIM card) to which transmission by SMS cannot be performed, the center 1 transmits a "transmission request" to the OEM server 3 managed by the manufacturer of the vehicle 4. The transmission request is data indicating commissioning the OEM server to transmit the enabling message to the vehicle 4 to which the enabling message is to be delivered, using predetermined communication means used by that OEM. The transmission request includes at least the information that identifies the recipient vehicle 4, the text message, and the enabling command.

The contract management server 2 is a server for managing the usage contracts of the OTA service. When the contract procedures for the predetermined vehicle 4 (user) are completed and the OTA service becomes available, the contract management server 2 transmits information thereof to the center 1.

The OEM servers 3 are servers of OEM systems managed by the OEMs. The OEM servers 3 are used to provide services unique to each OEM. The OEM servers 3 can communicate with the vehicles 4 produced by that OEM, using predetermined communication means. Note that the communication means used here may differ depending on OEMs. For example, a model A of a certain OEM employs Wi-Fi, and a model B of another OEM employs V2X, and so on. Upon receiving the transmission request from the center 1, the OEM server 3 transmits the enabling message to the vehicle 4 specified in the transmission request, using the predetermined communication means used by that OEM.

A later-described in-vehicle network system is installed in the vehicle 4. The in-vehicle network system is capable of communication with the center 1 and the OEM server 3.

Figure 2:
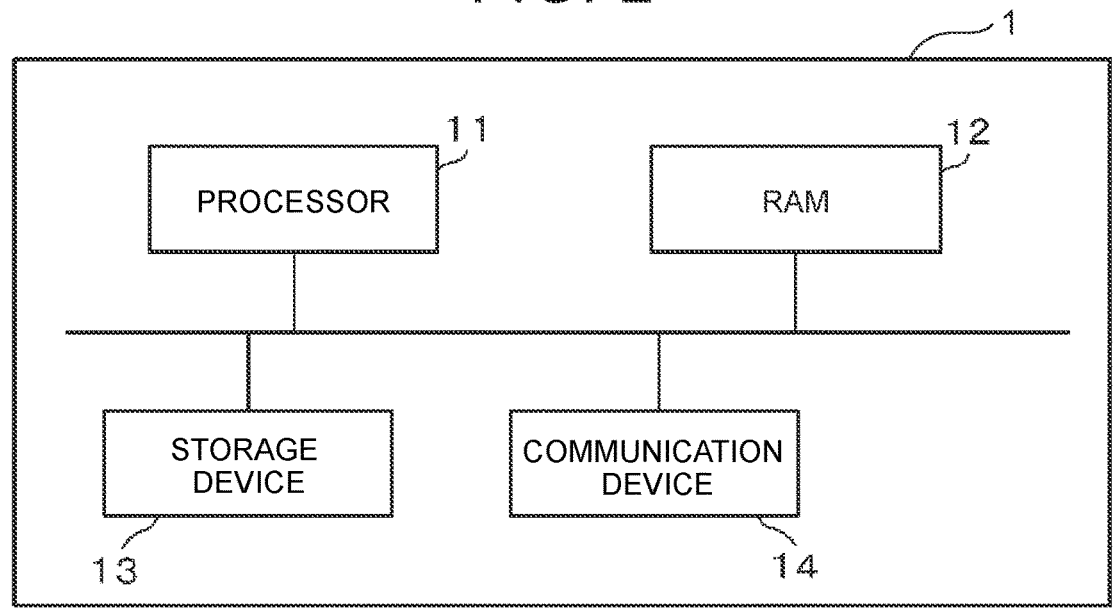
FIG. 2 is a block diagram illustrating a schematic configuration of a center 1.

FIG. 2 is a block diagram illustrating a schematic configuration of the center 1 in FIG. 1. As illustrated in FIG. 2, the center 1 includes a processor 11, random-access memory (RAM) 12, a storage device 13, and a communication device 14. The storage device 13 includes a readable/writable storage medium such as a hard disk or a solid state drive (SSD), and stores various types of programs and data necessary for the processing according to the present embodiment. At the center 1, the processor 11 executes predetermined control processing by executing programs read from the storage device 13 using the RAM 12 as a work region. The communication device 14 is equipment that communicates with other servers such as the contract management server 2 and the OEM server 3, and the vehicle 4, over the network.

The schematic configurations of the contract management server 2 and the OEM server 3 are the same as those of the center 1 in the present embodiment, although omitted from illustration.

Figure 3:
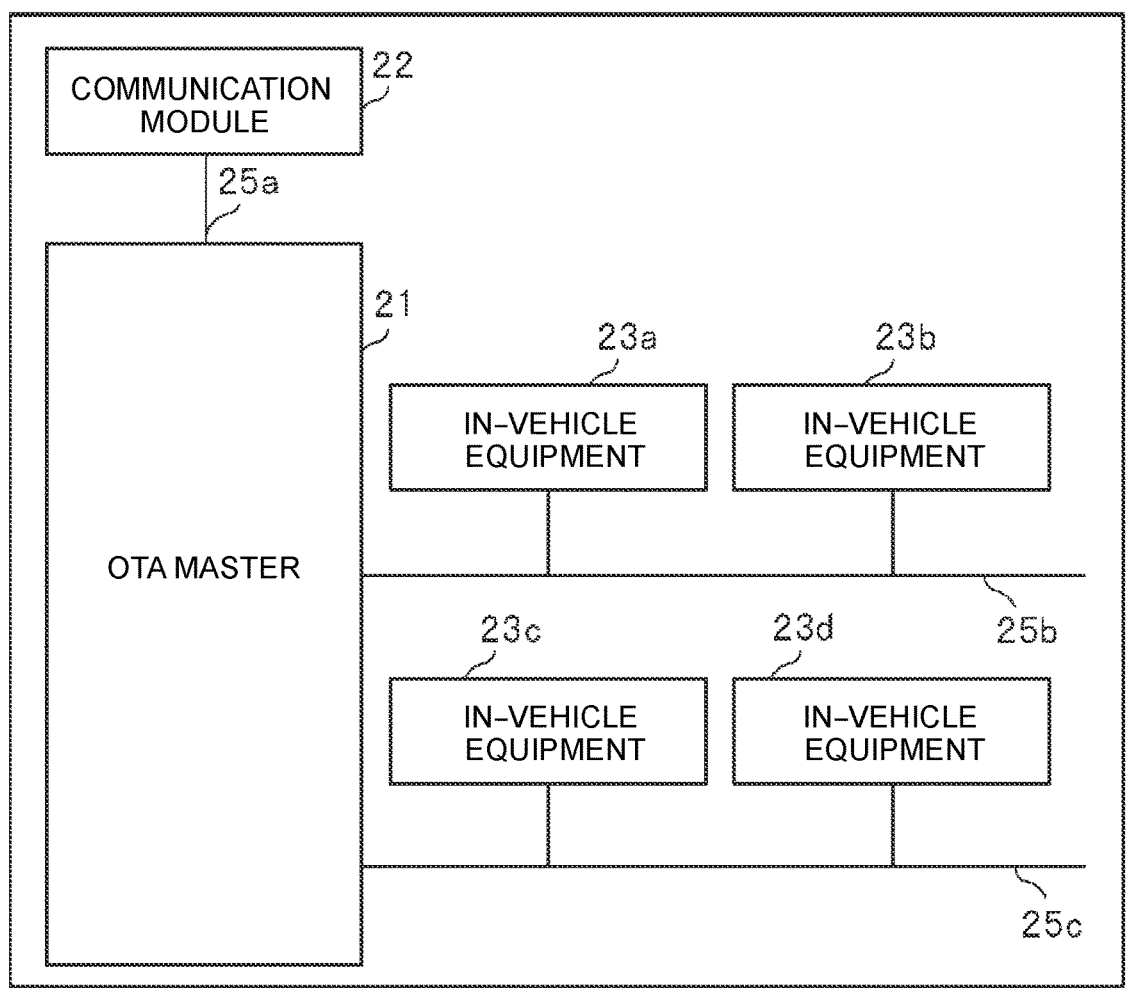
FIG. 3 is a block diagram illustrating a schematic configuration of an in-vehicle network system.

Next, FIG. 3 is a block diagram illustrating a schematic configuration of the in-vehicle network system installed in the vehicle 4. The in-vehicle network system includes at least the OTA master (software update device) 21, a communication module 22, and in-vehicle equipment 23a. The in-vehicle network system may include a plurality of pieces of in-vehicle equipment 23a through 23d. The OTA master 21 is connected to the communication module 22 via a bus 25a. The OTA master 21 is connected to the in-vehicle equipment 23a and 23b via a bus 25b. The OTA master 21 is connected to the in-vehicle equipment 23c and 23d via a bus 25c. The OTA master 21 is capable of wirelessly communicating with the center 1 and/or the OEM server 3 via the communication module 22. The OTA master 21 executes processing for enabling the software update function of the vehicle based on the enabling command included in the enabling message received from the center 1 (or OEM server 3). The communication module 22 is communication equipment that connects to a predetermined network (telephone network, Internet network, etc.). The in-vehicle equipment 23a through 23d control the operation of various parts of the vehicle 4.

Figure 4:
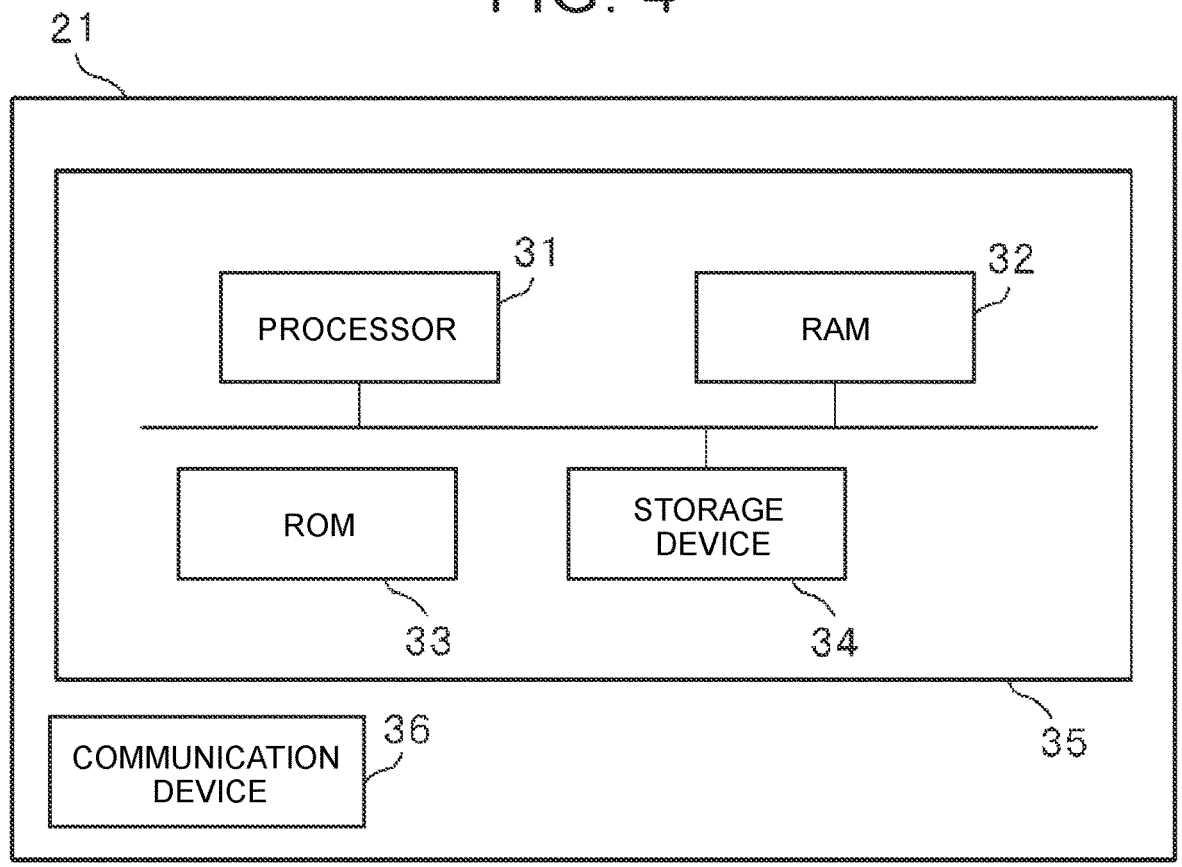
FIG. 4 is a block diagram illustrating a schematic configuration of an OTA master.

As illustrated in FIG. 4, the OTA master 21 includes a microcomputer 35 and a communication device 36. The microcomputer 35 includes a processor 31, RAM 32, read only memory (ROM) 33, and a storage device 34. In the OTA master 21, the processor 31 of the microcomputer 35 executes predetermined control processing by executing programs read from the ROM 33, using the RAM 32 as a work area. The communication device 36 is equipment that communicates with the communication module 22 and the in-vehicle equipment 23a through 23d via the buses 25a through 25c in FIG. 3.

Functional Block Diagram of Center 1

Figure 5:
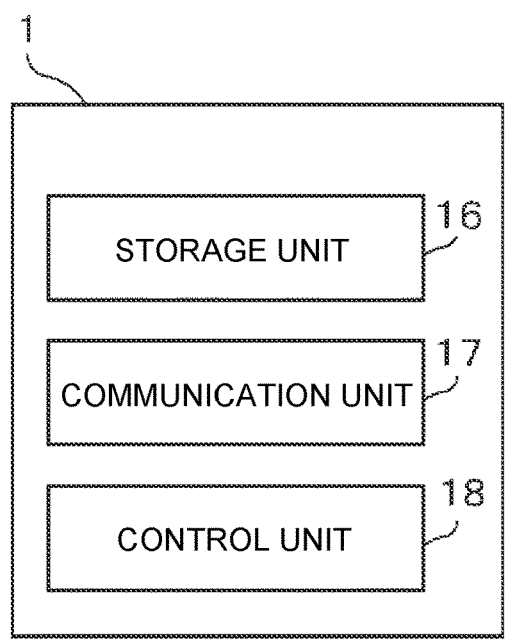
FIG. 5 is a functional block diagram of the center 1.

FIG. 5 is a functional block diagram of the center 1 illustrated in FIG. 2.

The center 1 includes a storage unit 16, a communication unit 17, and a control unit 18. The communication unit 17 and the control unit 18 are realized by the processor 11 illustrated in FIG. 2 executing programs stored in the storage device 13 using the RAM 12, and the storage unit 16 is realized by the storage device 13 illustrated in FIG. 2.

The storage unit 16 stores programs and data used in the processing according to the present embodiment.

When a new vehicle is produced, the communication unit 17 can receive vehicle information related to the new vehicle transmitted from a server (omitted from illustration) of a vehicle plant, for example. The vehicle information includes information such as vehicle identification No., OEM, model, and so forth. The communication unit 17 can also receive a notification from the contract management server 2 that the contract procedures for the OTA service have been completed for the predetermined vehicle. Also, the communication unit 17 can transmit an enabling message for OTA service to the predetermined vehicle using SMS. Further, the communication unit 17 can also transmit the transmission request to the OEM server 3 based on the command from the control unit 18.

The control unit 18 registers the vehicle information received when a new vehicle is produced, in a vehicle information database (described later). Further, upon receiving, from the contract management server 2, a notification that the contract procedures for the OTA service have been completed for the predetermined vehicle 4, the control unit 18 references the vehicle information database and determines the communication means of the vehicle 4. Thereupon, based on the results of the determination, the control unit 18 transmits the above enabling message from the center 1 to the vehicle 4 using SMS via the communication unit 17, for a vehicle to which the enabling message can be directly transmitted from the center 1 using SMS. On the other hand, for a vehicle to which the enabling message cannot be directly transmitted from the center using SMS, the control unit 18 transmits the above transmission request to the OEM server 3 of the manufacturer of the vehicle 4 via the communication unit 17. Further, after the OTA service is enabled, the control unit 18 can also transmit predetermined update data to the vehicle 4 using the communication means for the OTA service (Internet network in this example).

Functional Block Diagram of OTA Master

Figure 6:
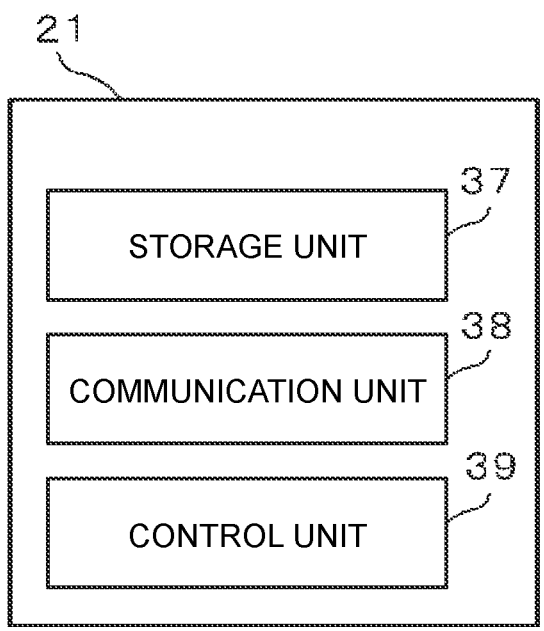
FIG. 6 is a functional block diagram of the OTA master 21.

FIG. 6 is a functional block diagram of the OTA master 21 illustrated in FIG. 4

The OTA master 21 includes a storage unit 37, a communication unit 38, and a control unit 39. The storage unit 37 is realized by the storage device 34 illustrated in FIG. 4, and the communication unit 38 and the control unit 39 are realized by the processor 31 illustrated in FIG. 4 executing programs stored in the ROM 33, using the RAM 32.

The storage unit 37 stores various types of programs and various types of data for realizing the software update function. The data also includes data indicating whether the software update function is currently enabled or disabled. For the initial value of this data, data indicating that the software update function is disabled is set.

The communication unit 38 receives the enabling message from the center 1 or the OEM server 3, and outputs the enabling message to the control unit 39. Also, after the software update function is enabled, the communication unit 38 receives the software update data for the in-vehicle equipment 23 from the center 1 as necessary.

The control unit 39 sets the software update function to the enabled state from the disabled state, by executing the enabling command included in the enabling message. Also, after the software update function is enabled, the control unit 39 performs various types of processing for controlling software updating of the in-vehicle equipment.

Details of the processing according to the present embodiment will be described below.

About Data Used

Figure 7:
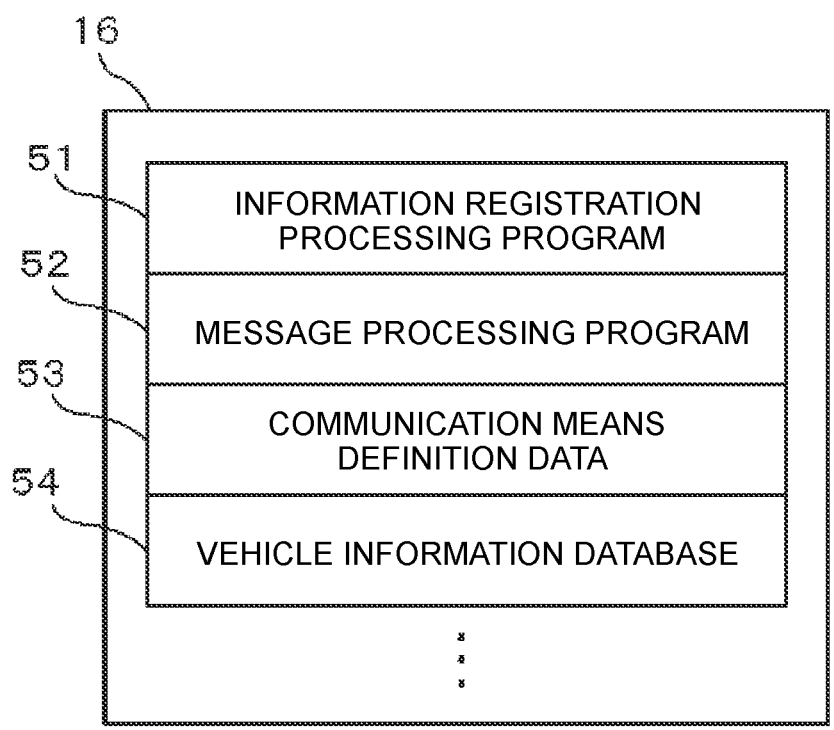
FIG. 7 is a memory map showing an example of data stored in a storage unit 16 of the center 1.

First, the data used in the processing of the present embodiment will be described. FIG. 7 is a memory map showing an example of data stored in the storage unit 16 of the center 1. An information registration processing program 51, a message processing program 52, communication means definition data 53, and a vehicle information database 54 are stored in the storage unit 16. Various types of programs and data for realizing the OTA service are also stored in the storage unit 16, although omitted from illustration.

The information registration processing program 51 is a program for executing processing of registering information related a newly-produced vehicle, in the vehicle information database 54 (later-described processing in FIG. 10). The message processing program 52 is a program for executing the processing of transmitting the enabling message (later-described processing in FIG. 11).

The communication means definition data 53 is data that defines the communication means related to the model, for each OEM model. FIG. 8 is a diagram showing an example of the data configuration of the communication means definition data 53. The communication means definition data 53 is tabular data having items that are OEM data 61, model data 62, and communication means data 63. The OEM data 61 is data that uniquely identifies each OEM, for example, a manufacturer code or the like. The model data 62 is data for identifying the model of the vehicle. Accordingly, the model and the OEM of a vehicle can be identified from the OEM data 61 and the model data 62. The communication means data 63 is data defining the communication means for the identified model. The communication means data 63 includes, for example, data that identifies the OEM and data that identifies the communication means. Also, the data that identifies the communication means includes information on communication standards or communication technology such as "SMS" and "Wi-Fi". For example, the communication means data 63 includes data identifying which OEM uses which communication means, such as "SMS of center 1", "SMS of OEM B", "V2X of OEM C", "Wi-Fi of OEM D", and so forth. Further, when communication means for other than the center 1 are defined, a specific destination (email address of OEM server 3, etc.) for transmitting the transmission request to the OEM, such as an address of an SMS server managed by the OEM, for example, may be defined. When newly registering vehicle information in the vehicle information database 54 at the center 1, the communication means definition data 53 is referenced and the communication means data 63 is acquired, and data including the contents thereof is registered in the vehicle information database 54.

The timing at which the data is registered in the communication means definition data 53 for the new model is described below, for example. That is to say, before mass-production of a certain model starts, design information including the communication means data 63 for that model is registered in the center 1 by the OEM. At the timing of the design information being registered, the communication means data 63 of the model to be mass-produced is registered in the communication means definition data 53.

Next, FIG. 9 is an example of the data configuration of the vehicle information database 54. The vehicle information database 54 is a database having at least items that are vehicle identification No. 71 and communication means data 72. The vehicle identification No. 71 is a unique number for identifying each vehicle. The communication means data 72 is data indicating communication means for the vehicle identified by the vehicle identification No. 71, and is data copied from the communication means definition data 53.

Also, the vehicle information database 54 may store data indicating the OEM and the model of the vehicle, the user of the vehicle, and whether there is an OTA service contract, although omitted from illustration.

About Processing Executed at Center 1

Next, details of the processing executed by the control unit 18 of the center 1 will be described.

Vehicle Information Registration Processing

Figure 10:
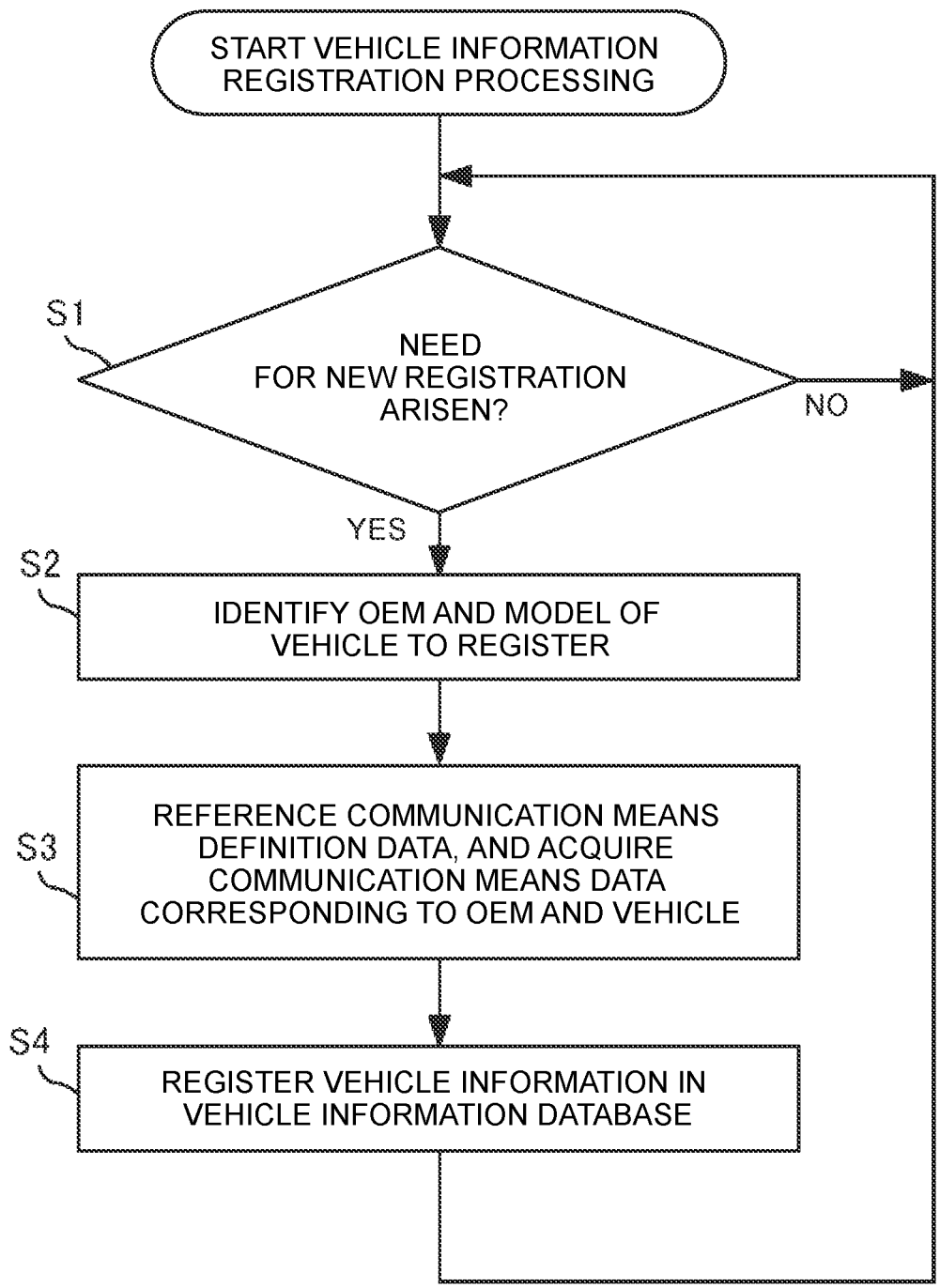
FIG. 10 is a flowchart showing details of vehicle information registration processing.

FIG. 10 is a flowchart showing details of vehicle information registration processing. This processing is processing for registering new vehicle data in the vehicle information database, based on the vehicle information transmitted from the server of the vehicle plant at the time of vehicle production.

In FIG. 10, first, in step S1, the control unit 18 determines whether there is a need to register new data in the vehicle information database 54 (first determination). Specifically, the control unit 18 determines whether the vehicle information on the newly-produced vehicle has been received from the server of the vehicle plant described above, and when received, determines that the data needs to be registered. When there is found no need to register the data as a result of the determination, (NO in step S1), the control unit 18 continues to stand by for the vehicle information to be sent from the server of the vehicle plant. On the other hand, when there is a need for data registration (YES in step S1), then in step S2, the control unit 18 identifies the OEM and the model of the vehicle to be registered this time, based on this vehicle information. Next, in step S3, the control unit 18 refers to the communication means definition data 53, and acquires the communication means data 63 corresponding to the identified OEM and the model.

Next, in step S4, the control unit 18 registers data corresponding to the vehicle information and the acquired communication means data 63, in the vehicle information database 54 as a new record. Thereafter, the flow returns to step S1, and the processing is repeated. This so far has been description of the vehicle information registration processing.

Enabling Message Processing

Figure 11:
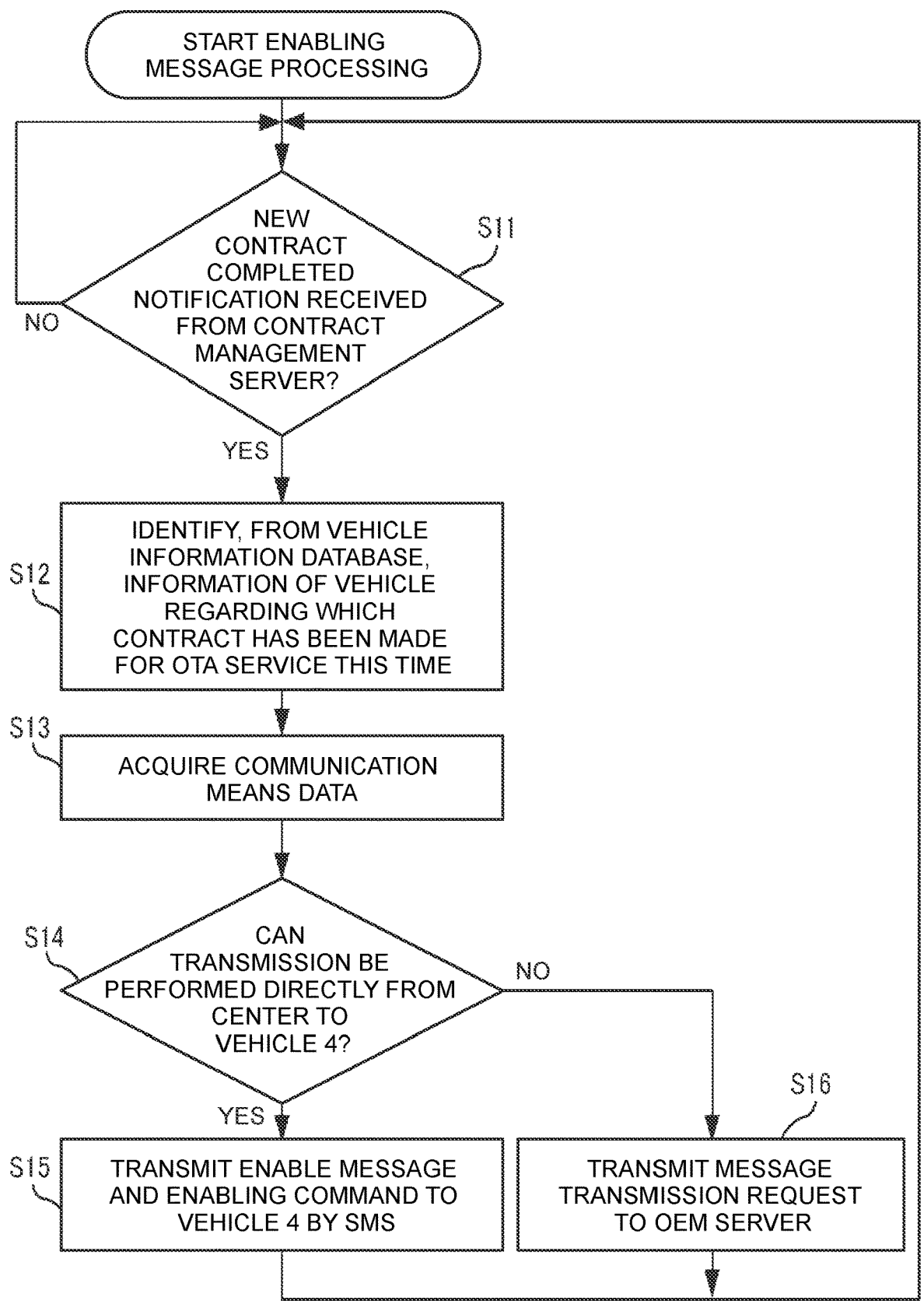
FIG. 11 is a flowchart showing details of enabling message processing.

Next, details of the enabling message processing for transmitting the enabling message to a predetermined vehicle will be described. FIG. 11 is a flowchart showing details of the enabling message processing. First, in step S11, the control unit 18 determines whether a notification indicating that the OTA service usage contract has been completed has been received from the contract management server 2. The notification includes a vehicle identification No. indicating the vehicle regarding which the contract has been completed. When it is found to have been received no notification as a result of the determination, (NO in step S11), the control unit 18 continues to stand by for the notification. On the other hand, when the notification is received (YES in step S11), in step S12, the control unit 18 identifies the vehicle entering into contract for the OTA service this time based on the vehicle identification No.

included in the notification, from the vehicle information database 54. Next, in step S13, the control unit 18 acquires the communication means data 72 of the identified vehicle from the vehicle information database 54.

Next, in step S14, the control unit 18 determines whether the enabling message can be transmitted from the center 1 to the identified vehicle, using the communication means decided in advance, based on the acquired communication means data 72 (second determination). Specifically, when the content defined in the communication means data 72 indicates "SMS of the center 1", the control unit 18 determines that transmission from the center 1 can be performed. Further, when the contents defined in the communication means data 72 are contents other than the "SMS of the center 1", that is, contents that define communication means of the OEM other than the center 1, the control unit 18 determines that the enabling message cannot be transmitted from the center 1 using the communication means decided in advance (SMS of the center 1).

When transmission is able to be performed from the center 1 as a result of the determination in step S14 (YES in step S14), in step S15, the control unit 18 uses the communication means indicated by the communication means data 72, i.e., SMS, to transmit the enabling message to the vehicle 4. At the OTA master 21 that has received the enabling message, the enabling message received by the communication unit 38 is output to the control unit 39. The control unit 39 then executes processing of enabling the software update function, by executing the enabling command included in the enabling message. At this time, the OTA master 21 may display the text message included in the enabling message on a predetermined display device (omitted from illustration), and execute the enabling command after receiving a confirmation operation from the user.

On the other hand, when transmission by SMS from the center 1 is unable to be performed as a result of the determination in the above step S14, (NO in step S14), in step S16 the control unit 18 generates the transmission request addressed to the predetermined OEM server 3, based on the communication means data 72. The control unit 18 then transmits the transmission request to the OEM server 3. Note that for the communication at this time, inter-server communication (that is already constructed) may be used, for example. Also, at the OEM server 3 that receives the transmission request, the predetermined communication means (SMS, Wi-Fi, V2X, etc.) employed by the OEM are used to execute the processing of transmitting the text message for enabling and the enabling command included in the transmission request, to the vehicle specified in the transmission request.

After the processing of the above step S15 or step S16, the flow returns to step S11 and the processing is repeated. This so far has been description of the enabling message processing.

Effects

Thus, in the present embodiment, when the center 1 transmits to the vehicle the message that the OTA service has become available and the enabling command, the communication means used for this transmission are decided in advance (SMS in the above example). On the other hand, the communication standard implemented in vehicles is different for each OEM as described above, and accordingly there may be vehicles to which the enabling command cannot be transmitted, depending on the communication means decided in advance at the center 1. Even when there are such vehicles, the enabling message can be transmitted via the OEM server 3, according to the present embodiment. That is to say, regardless of the combination of the communication means available at the center 1 and the communication means implemented for each vehicle, the enabling message can be sent, and the software update function can be enabled.

Modifications

Note that an example is given in the above embodiment assuming a case in which the OTA service enabling message is transmitted at a stage in which the OTA service is not enabled. This arrangement is not limiting, and the above processing is applicable when wanting to transmit a predetermined message or command from the center 1 to the vehicle, even after the OTA service is enabled. Specifically, after the OTA service is enabled, communication for the OTA service may be performed between the OTA master 21 and the center 1 as necessary, but a decision may have been made in advance that regarding initiation of communication between the two at this time, the communication connection is always initiated from the OTA master 21 side. In this case, communication for the OTA service cannot be used unless the connection is initiated from the OTA master 21 side, even though the OTA service is in an enabled state. In this situation, there may be cases in which the center 1 wants to send a predetermined command to the OTA master 21, that is, the center 1 wants to initiate communication. Even in such cases, predetermined commands can be transmitted to the predetermined OTA master 21 by using the communication means, based on the communication means data 72. A conceivable example of the command to be transmitted in this case is a command to upload the log data of the vehicle to the center 1.

Further, a configuration example in which the communication means definition data 53 is stored in the storage unit 16 is given in the above embodiment. However, this arrangement is not limiting, and in another embodiment, a configuration may be made in which the communication means data 63 is included in the vehicle information transmitted from the vehicle plant to the center 1. In this case, the center 1 may register the vehicle information transmitted from the vehicle plant to the vehicle information database 54 without change.

Also, in another embodiment, a plurality of communication means may be defined as the contents of the communication means data 63. Further, an order of priority of use may be set for the communication means. For example, three types of communication means, which are "SMS of the OEM B", "Wi-Fi of the OEM B", and "V2X of the OEM B", may be defined for the communication means data 63 for the model B of the OEM B. Furthermore, the order of priority between these may be set. The center 1 may perform predetermined transmission using one of the communication means in accordance with the order of priority. As a result, when a transmission error is detected, for example, transmission may be performed using the communication means set next in the order of priority. That is to say, when transmission by the communication means of the first order of priority cannot be performed, processing may be performed to search for other available communication means and transmit therewith.

Although an embodiment of the technology according to the present disclosure has been described above, the present disclosure can be understood as being, in addition to a center, an update management method executed by a computer provided with a processor, memory, and a communication device capable of communication with an OTA master provided in a vehicle and with a predetermined server over a network, a control program of the method, and a computer-readable non-transitory recording medium storing the control program, and so forth.

The technology according to the present disclosure can be used in a center for managing software update functions by OTA masters.

What is claimed is:

1. A center configured to communicate over a network with a predetermined server and an OTA master installed in a vehicle, the center comprising a processor configured to:
   store communication means information in which information indicating communication means for transmitting predetermined data to the OTA master is defined in advance;
   determine whether a command is transmittable from the center to the OTA master based on the communication means information;
   transmit, when the processor determines that the command is transmittable from the center to the OTA master, the command to the OTA master using the communication means defined in the communication means information; and
   transmit, when the processor determines that the command is not transmittable from the center to the OTA master, request data to an OEM server, the OEM server being managed by a manufacturer of the vehicle in which the OTA master is installed, the request data being data for commissioning the OEM server to transmit the command.

2. The center according to claim 1, wherein the processor is configured to:
   determine whether a predetermined condition is satisfied, the predetermined condition being a condition for changing a software update function of the OTA master from a disabled state to an enabled state; and
   determine, when the processor determines that the predetermined condition is satisfied, whether the command is transmittable from the center to the OTA master based on the communication means information, the command being an enabling command for changing the software update function of the OTA master that is determined to satisfy the predetermined condition to the enabled state.

3. The center according to claim 1, wherein:
   the communication means information includes at least information relating to communication technology or a communication standard, used in the communication means for transmitting the predetermined data; and
   the processor is configured to determine that, when the communication means of the vehicle is the communication means using the communication technology or the communication standard, that are not able to be used by the center, transmission is not able to be performed from the center to the OTA master of the vehicle.

4. The center according to claim 2, wherein the processor is configured to, when the software update function is in the enabled state, perform communication relating to the software update function with the OTA master, using another network that is different from the network used for transmission of the enabling command.

5. An update management method executed by a computer including a processor, memory, and a communication device, the communication device being configured to communicate with a predetermined server and an OTA master installed in a vehicle over a network, the method comprising:
   storing, in the memory, communication means information in which information indicating communication means for transmitting predetermined data to the OTA master is defined in advance;
   determining whether a command is transmittable from a center to the OTA master, based on the communication means information;
   transmitting, when it is determined that the command is transmittable from the center to the OTA master, the command to the OTA master using the communication means defined in the communication means information; and
   transmitting, when it is determined that the command is not transmittable from the center to the OTA master, request data to an OEM server, the OEM server being managed by a manufacturer of the vehicle in which the OTA master is installed, the request data being data for commissioning the OEM server to transmit the command.

6. A non-transitory storage medium storing instructions that are executable by a computer including a processor, memory, and a communication device, and that cause the computer to perform functions, the communication device being configured to communicate with a predetermined server and an OTA master installed in a vehicle over a network, the functions comprising:
   storing, in the memory, communication means information in which information indicating communication means for transmitting predetermined data to the OTA master is defined in advance;
   determining whether a command is transmittable from a center to the OTA master based on the communication means information;
   transmitting, when it is determined that the command is transmittable from the center to the OTA master, the command to the OTA master using the communication means defined in the communication means information; and
   transmitting, when it is determined that the command is not transmittable from the center to the OTA master, request data to an OEM server, the OEM server being managed by a manufacturer of the vehicle in which the OTA master is installed, the request data being data for commissioning the OEM server to transmit the command.

* * * * *